United States Patent [19]
Nogami et al.

[11] Patent Number: 5,091,009
[45] Date of Patent: Feb. 25, 1992

[54] COATING COMPOSITION AND A PROCESS FOR MANUFACTURING THE SAME

[75] Inventors: Tatsuya Nogami; Kenichi Okubi; Yoshitane Watanabe, all of Funabashi, Japan

[73] Assignee: Nissan Chemical Industries, Ltd., Tokyo, Japan

[21] Appl. No.: 449,817

[22] Filed: Dec. 13, 1989

[30] Foreign Application Priority Data

Dec. 15, 1988 [JP] Japan .................. 63-317009
Oct. 16, 1989 [JP] Japan .................. 1-268390

[51] Int. Cl.$^5$ ............................................. C09K 3/00
[52] U.S. Cl. .......................... 106/287.1; 106/287.17; 106/287.23
[58] Field of Search ............ 106/287.1, 287.17, 287.23

[56] References Cited

U.S. PATENT DOCUMENTS

| | | |
|---|---|---|
| 3,377,494 | 4/1968 | Repsher . |
| 3,926,658 | 12/1975 | Cole et al. . |
| 4,159,209 | 6/1979 | Womersley ............ 106/287.17 |
| 4,361,598 | 11/1982 | Yoldas ............ 106/287.17 |
| 4,579,594 | 4/1986 | Nanao et al. ............ 106/287.17 |
| 4,808,653 | 2/1989 | Haluska et al. ............ 106/287.1 |

FOREIGN PATENT DOCUMENTS

965243 7/1964 United Kingdom .

OTHER PUBLICATIONS

Y. Takahashi, Y. Matsuoka—Dip–Coating of $TiO_2$ Films using a Sol Derived from $Ti(O-i-Pr)_4$–Diethanolamine–$H_2O$–i–PrOH System, Jun. 1988, Journal of Materials Science.

Hawley's Condensed Dictionary, 11 ed., Sax et al., Van Nostrand Reinhold Co., 1987, pp. 231–232.

Primary Examiner—Mark L. Bell
Assistant Examiner—Sue Hollenbeck
Attorney, Agent, or Firm—Oliff & Berridge

[57] ABSTRACT

A coating composition for forming an inorganic film on a glass, ceramic metal or plastic surface is obtained by hydrolyzing and condensing a metal alkoxide of the general formula:

$$M(OR)_n$$

wherein M represents a metal atom, R represents an alkyl group having 1 to 5 carbon atoms, and n represents the valence number of M in an organic solvent in the presence of an aluminum salt; and adding a deposition inhibitor which prevents the separation of the aluminum salt when a film is formed. A process for preparing the composition is also disclosed.

12 Claims, No Drawings

COATING COMPOSITION AND A PROCESS FOR MANUFACTURING THE SAME

BACKGROUND OF THE INVENTION

1. Field of the Invention

The present invention relates to a coating composition which is used to form an inorganic film on a substrate made of a material such as glass, ceramics, metals or plastics, and a process for manufacturing the same.

2. Description of the Prior Art

Inorganic films are formed for a variety of purposes on the surfaces of substrates made of materials such as glass, ceramics, metals and plastics. The film imparts specific electrical, optical, chemical or mechanical properties to the substrate material. Specific purposes of the films include electrical conduction or insulation, the selective transmission or absorption of light, the prevention of elution of an alkaline substance, and the formation of a film having chemical resistance, or a hard coating film.

These films are formed by a gas-phase process, such as CVD, PVD or sputtering process, or by a liquid-phase process employing an alkoxide compound, etc. The gas-phase process usually requires an expensive apparatus, such as one for vacuum deposition. The size and shape of the substrate on which a film can be formed are limited by the size of the apparatus which is employed.

The sol-gel process employing an alkoxide compound, etc. has the advantage of being capable of forming a film on a surface having a large area. When this process is employed, however, it is often difficult to maintain a coating solution of good quality and achieve a satisfactory control of the atmosphere, including the control of humidity, as all the alkoxide compounds, except silicon alkoxide, are rapidly hydrolyzed (Japanese Patent Laid-open Publication No. Sho 52-138512 (138512/1977)).

An attempt has been made to prepare a coating solution by adding a chelating agent, such as acetylacetone, to control the rate at which an alkoxide compound is hydrolyzed (Japanese Patent Laid-open Publication No. Sho 63-258959 (258959/1988)). However, the chelated compound usually has a higher thermal decomposition temperature and need be heated to a temperature of at least 450° C.

An attempt has also been made to prepare a transparent coating solution by adding a mineral acid to the hydrolyzed product of silicon alkoxide and titanium alkoxide, while not relying upon any stabilizing method, such as chelating (Japanese Patent Laid-open Publication No. Sho 55-25487 (25487/1980)). This is known as a silica-titania coating solution. This solution is, however, low in storage stability, particularly to water.

There is known a coating solution using silicon alkoxide, which is hydrolyzable only slowly (Japanese Patent Publication No. Sho 63-58867 (58867/1988)). This solution is used to form, for example, a film for preventing the elution of an alkali. This solution, however, can only form a film of low mechanical strength when baked at a lower temperature.

There is also known a silica-alumina coating solution. There has been reported an ethanol solution of tetraethoxysilane and aluminum nitrate as a mullite coating solution Speech #2G39 at the Annual Meeting of the Ceramic Society of Japan in 1987). This solution is, however, low in film-forming stability. The mullite coating solution can form a uniform film if used immediately after its preparation, but if used after several days of storage, the separation of its aluminum component occurs during its application or drying.

SUMMARY OF THE INVENTION

Under these circumstances, it is an object of the present invention to provide a coating composition which has a high degree of storage and film-forming stability, and which can form a film of high mechanical strength without requiring any baking of the film at a high temperature.

It is another object of the present invention to provide a process for manufacturing the coating composition.

The coating composition of the present invention may be obtained by hydrolyzing and condensing a metal alkoxide of the general formula I:

$$M(OR)_n \qquad (I)$$

wherein M represents a metal, R represents an alkyl group having 1 to 5 carbon atoms, and n represents the valence number of M in an organic solvent in the presence of an aluminum salt; and by adding a deposition inhibitor which has an effect to prevent aluminum salts from being deposited at the formation of film.

According to a preferred aspect of the present invention, the alkoxide consists of, or contains titanium alkoxide, and the solvent contains alkylene glycol or a monether thereof in organic solvent.

The composition has a high degree of storage and film-forming stability and can form a film having a high degree of mechanical strength and a refractive index of 1.4 to 2.1 without requiring any baking at a high temperature.

DETAILED DESCRIPTION OF THE INVENTION

The coating composition of the present invention may be obtained by hydrolyzing and condensing a metal alkoxide in an organic solvent in the presence of an aluminum salt, and a deposition inhibitor. The deposition inhibitor prevents the deposition or separation of the aluminum salt from occurring when a film is formed.

The metal alkoxide may be metal alkoxide of silicon, titanium, tantalum, zirconium, boron, aluminum, magnesium, or zinc. It is, however, preferable from an economical standpoint and also in view of the storage stability of the coating composition to use silicon alkoxide or a product of its partial condensation, or titanium alkoxide, or a mixture thereof. To obtain the present invention, these alkoxides are hydrolyzed and condensed in an organic solvent in the presence of aluminum salt and are further added with a deposition inhibitor which has an effect to prevent the aluminum salt from being deposited into the film at forming a coated film on the coating composition.

If the composition contains titanium alkoxide, the organic solvent contains alkylene glycol or a monoether thereof. The akylene glycol or a monoether thereof stabilizes the titanium alkoxide and thereby makes it possible to improve the storage stability of the composition.

The composition containing titanium alkoxide is manufactured by adding alkylene glycol or a monoether thereof to titanium alkoxide to stabilize it, and hydrolyzing and condensing the titanium alkoxide (or a mixture thereof with silicon alkoxide) in the presence of an aluminum salt. The composition containing both titanium alkoxide and silicon alkoxide is manufactured by hydrolyzing silicon alkoxide in the presence of an aluminum salt, and mixing it with the titanium alkoxide which has been stabilized by alkylene glycol or a monoether thereof.

The metal alkoxide which is employed for the composition of the present invention has the general formula I:

$$M(OR)_n \quad (I)$$

wherein M represents a metal, R represents an alkyl group having 1 to 5 carbon atoms, and n represents the valence number of M. The silicon alkoxide may be a compound of the general formula II:

$$Si(OR')_4 \quad (II)$$

wherein R' represents an alkyl group having 1 to 5 carbon atoms, or a mixture of two or more of such compounds, or a product of its partial condensation of which each molecule comprises not more than five monomer molecules. The titanium alkoxide may be a compound of the general formula III:

$$Ti(OR'')_4 \quad (III)$$

wherein R'' represents an alkyl group having 1 to 5 carbon atoms, or a mixture of two or more of such compounds.

The aluminum salt which is employed for the purpose of the present invention may be selected from ones which are soluble in water or an organic solvent. It is, therefore, possible to use aluminum nitrate, aluminum sulfate, aluminum acetate, aluminum chloride, aluminum oxalate, aluminum sulfamate, etc., or a basic salt thereof. The use of aluminum nitrate, aluminum chloride or aluminum oxalate, or a basic salt thereof, is particularly preferred.

The organic solvent may be selected from among alcohols such as methanol, ethanol, n- or i-propanol and n-, i- or t-butanol, esters such as ethyl acetate, glycols such as ethylene glycol, ester derivatives thereof, ethers such as diethyl ether, ketones such as acetone, methyl ethyl ketone and cyclohexanone, and aromatic hydrocarbons such as benzene and toluene. A mixture of two or more of such solvents can be also used.

If the coating composition contains titanium alkoxide, the organic solvent contains alkylene glycol or a monoether thereof, as hereinabove stated. In this connection, it may contain, for example, ethylene glycol, diethylene glycol, propylene glycol or hexylene glycol, or a monomethyl, monoethyl, monopropyl, monobutyl or monophenyl ether thereof. If the glycol or monoether thereof which the solvent contains has only a molar ratio of less than 1 to the titanium alkoxide, the alkoxide is not stabilized satisfactorily to give a coating composition having high storage stability. No problem results from the use of a large amount of glycol or monoether thereof.

The whole amount of the organic solvent which is employed may consist of any such glycol or monoether thereof. When the coating composition is of the type not containing any titanium alkoxide, however, the organic solvent is not required to contain any such glycol or monoether thereof.

The deposition inhibitor may comprise at least one compound selected from among N-methylpyrrolidone, dimethylformamide, dimethylacetamide, ethylene glycol, diethylene glycol and the derivatives thereof. The deposition inhibitor is employed in a weight ratio of at least 1 to aluminum as $Al_2O_3$. If it has a weight ratio of less than 1 to $Al_2O_3$, it is not expected to prevent satisfactorily the deposition of the aluminum salt when a film is formed and dried. The use of a large amount of precipitation inhibitor does not have any adverse effect on the coating composition. The deposition inhibitor may be added when the metal alkoxide is hydrolyzed and condensed in the presence of the aluminum salt, or thereafter.

The metal atoms M in the metal alkoxide have the following relation by molar ratio to the aluminum atoms:

$$0.01 \leq \frac{Al}{M + Al} \leq 0.7 \text{ (molar ratio)}.$$

If the ratio is smaller than 0.01, the composition fails to form a film having a satisfactorily high degree of mechanical strength. If it is greater than 0.7, the composition tends to form a film not adhering satisfactorily to the substrate, and moreover, a film having low chemical resistance when baked at a temperature not exceeding 450° C.

The coating solution preferably has a solid content of 0.5 to 20 % by weight consisting of a total amount of metal alkoxide as $MO_{n/2}$ and aluminum salt as $Al_2O_3$. If its solid content exceeds 20 % by weight, the solution has a lower degree of storage stability and also makes it difficult to control the thickness of a film which is thereby formed. If its solid content is lower than 0.5 % by weight, it can form only a film having an undesirably small thickness when applied only once, and need be applied repeatedly to achieve a desired film thickness.

The composition of the present invention is prepared by hydrolyzing and condensing a metal alkoxide of the formula $M(OR)_n$ in an organic solvent in the presence of an aluminum salt. If the amount of water used for the hydrolysis of e.g., silicon alkoxide and/or titanium alkoxide is smaller than 2 mols for the total mols of the alkoxide, it fails to hydrolyze the alkoxide satisfactorily, resulting in a composition having low film formability and failing to form a film having satisfactory strength. The same is true when any other metal alkoxide is used, too. If the aluminum salt which is employed is of the type containing water, its water content need be taken into consideration when the amount of water used for hydrolysis is determined, insofar as the water which the salt contains also participates in the hydrolysis.

The molar ratio of silicon and titanium alkoxides which are employed to prepare the coating composition depends on the refractive index required of the film which is thereby formed. A coating solution obtained by the hydrolysis of silicon alkoxide alone forms a film having a refractive index of 1.45, while one obtained by the hydrolysis of only titanium alkoxide forms a film having a refractive index of 2.1. An appropriate ratio of silicon and titanium alkoxides is, therefore, selected to prepare a coating solution which can form a film having a desired refractive index. Any other metal alkoxide can also be employed to achieve such refractive index control.

However, the composition containing titanium alkoxide which is prepared as hereinabove described tends to increase its viscosity gradually during storage at room temperature and make it difficult to achieve the accurate control of film thickness. This tendency becomes higher with an increase in the proportion of titanium alkoxide which the composition contains. This is apparently due to the fact that titanium alkoxide undergoes hydrolysis and condensation more rapidly than silicon alkoxide.

Under these circumstances, the inventors of the present invention have found out that the following two processes are useful for preparing a coating composition which is less likely to change its viscosity, even if it may contain titanium alkoxide:

(1) Titanium alkoxide is well mixed with glycols before it is hydrolyzed in the presence of an aluminum salt, and after it has been mixed with silicon alkoxide, if any, the mixture is hydrolyzed in an organic solvent. Heat is generated when titanium alkoxide is mixed with glycols. This is apparently due to the fact that an ester interchange reaction occurs between the alkoxide groups of titanium alkoxide and the glycols, and thereby stabilizes the alkoxide during hydrolysis and condensation.

(2) Silicon alkoxide is hydrolyzed in the presence of an aluminum salt, and is mixed with the titanium alkoxide which has been mixed with glycols, so that the mixture may undergo a condensation reaction.

Although silicon alkoxide is rapidly hydrolyzed, it is condensed more slowly than titanium alkoxide. If titanium alkoxide is added promptly to the hydrolyzed silicon alkoxide, the silanol groups of the hydrolyzed silicon alkoxide react uniformly with the titanium alkoxide, and the hydrolyzed silicon alkoxide thereby stabilizes the condensation reaction of the titanium alkoxide.

Although the process in which hydrolyzed silicon alkoxide is mixed with titanium alkoxide has already been tried, it is impossible to obtain a coating composition of high storage stability if the organic solvent which is employed does not contain any glycol.

The process as described at (2) above is also useful for preparing a coating composition from another rapidly hydrolyzable metal alkoxide and silicon alkoxide.

The coating composition of the present invention can be applied by a customary method, such as dip coating, spin coating, spray coating, brush coating, roll transfer, or screen printing.

The present invention will now be described more specifically with reference to a plurality of examples. It is, however, to be understood that the following description is not intended to limit the scope of the present invention.

EXAMPLE 1

(Basic Example)

A coating solution containing 20 mol % of aluminum was obtained by mixing uniformly 20.8 g of tetraalkoxysilane as silicon alkoxide, 72.3 g of ethanol as an organic solvent, 12.5 g of aluminum nitrate [$Al(NO_3)_3 \cdot 9H_2O$] as an aluminum salt, 17 g of ethylene glycol as a deposition inhibitor, and 5.4 g of water. The composition of the solution is shown in Table 1.

EXAMPLES 2 and 3

(Different deposition inhibitors were used.)

EXAMPLE 1 was repeated, except that N-methylpyrrolidone was used as the deposition inhibitor in EXAMPLE 2, and dimethylformamide in EXAMPLE 3. See Table 1.

EXAMPLE 4

(A larger amount of deposition inhibitor was employed.)

EXAMPLE 1 was repeated, except that the amount of ethylene glycol was increased to 51 g. See Table 1.

EXAMPLES 5 and 6

(Different aluminum salts were used.)

EXAMPLE 1 was repeated, except that hydrated aluminum chloride ($AlCl_3 \cdot 6H_2O$) was used as the aluminum salt in EXAMPLE 5, and basic aluminum oxalate having an aluminum content of 12.8 % in EXAMPLE 6. See Table 1.

EXAMPLES 7 and 8

(Compositions having different mol % of aluminum)

EXAMPLE 1 was repeated, except that the amounts of silicon alkoxide and aluminum salt were changed so as to yield a coating solution containing 10 mol % of aluminum in EXAMPLE 7, or 50 mol % in EXAMPLE 8. See Table 1.

EXAMPLE 9

(A condensate of silicon alkoxide was used)

EXAMPLE 1 was repeated, except that the tetraethoxysilane was replaced by a partial condensation product thereof known as Ethyl Silicate 40, product of Colcoat K.K. and having an $SiO_2$ content of 40 %. See Table 1.

COMPARATIVE EXAMPLE 1

(No deposition inhibitor was employed.)

EXAMPLE 1 was repeated, except that no ethylene glycol was employed. See Table 1.

COMPARATIVE EXAMPLE 2

(No aluminum salt was used.)

A coating solution was prepared by mixing uniformly 20.8 g of tetraethoxysilane, 73.7 g of ethanol, 5.4 g of water and 0.1 g of concentrated hydrochloric acid as a catalyst. See Table 1.

TABLE 1

| | Alkoxysilane | | Aluminum Salt | | deposition Inhibitor | | Composition of Coating Solution* | | | |
|---|---|---|---|---|---|---|---|---|---|---|
| | Kind | Amount (g) | Kind | Amount (g) | Kind | Amount (g) | Al/ Si + Al | deposition Inhibitor/ $Al_2O_2$ | $H_2O$/ $SiO_2$ | Solid Content |
| Example 1 | $Si(OC_2H_5)_4$ | 20.8 | $Al(NO_3)_3.9H_2O$ | 12.5 | Ethylene glycol | 17 | 0.2 | 10 | 3 | 6 |
| Example 2 | $Si(OC_2H_5)_4$ | 20.8 | $Al(NO_3)_3.9H_2O$ | 12.5 | N-methyl-pyrrolidone | 17 | 0.2 | 10 | 3 | 6 |
| Example 3 | $Si(OC_2H_5)_4$ | 20.8 | $Al(NO_3)_3.9H_2O$ | 12.5 | Dimethyl-formamide | 17 | 0.2 | 10 | 3 | 6 |
| Example 4 | $Si(OC_2H_5)_4$ | 20.8 | $Al(NO_3)_3.9H_2O$ | 12.5 | Ethylene glycol | 51 | 0.2 | 30 | 3 | 6 |
| Example 5 | $Si(OC_2H_5)_4$ | 20.8 | $AlCl_3.6H_2O$ | 8.0 | Ethylene glycol | 17 | 0.2 | 10 | 3 | 6 |
| Example 6 | $Si(OC_2H_5)_4$ | 20.8 | $Al_2(OH)_2(C_2O_4)_2XH_2O$ | 7.0 | Ethylene glycol | 17 | 0.2 | 10 | 3 | 6 |
| Example 7 | $Si(OC_2H_5)_4$ | 19.1 | $Al(NO_3)_3.9H_2O$ | 3.8 | Ethylene glycol | 5.2 | 0.1 | 10 | 3 | 6 |
| Example 8 | $Si(OC_2H_5)_4$ | 11.2 | $Al(NO_3)_3.9H_2O$ | 10.1 | Ethylene glycol | 5.2 | 0.5 | 3.8 | 3 | 6 |
| Example 9 | Ethyl silicate 40 | 15 | $Al(NO_3)_3.9H_2O$ | 12.5 | Ethylene glycol | 17 | 0.2 | 10 | 3 | 6 |
| Comparative Example 1 | $Si(OC_2H_5)_4$ | 20.8 | $Al(NO_3)_3.9H_2O$ | 12.5 | — | 0 | 0.2 | 0 | 3 | 6 |
| Comparative Example 2 | $Si(OC_2H_5)_4$ | 20.8 | — | 0 | — | 0 | 0 | 0 | 3 | 6 |

*Al/Si + Al: Mol ratio
$H_2O/SiO_2$: Mol ratio
deposition inhibitor/$Al_2O_3$: Weight ratio
Solid content: Weight % of $(SiO_2 + Al_2O_3)$

EXAMPLE 10

Each of the solutions which had been prepared in EXAMPLES 1 to 9 and COMPARATIVE EXAMPLES 1 and 2 was applied onto a glass plate by spin coating at a spinning speed of 3000 rpm. The solution was dried on a hot plate having a temperature of 80° C. for 10 minutes and the resulting film was baked at 200° C. for 20 minutes. The film (hereinafter referred to as the "initial film") was examined for pencil hardness and transparency.

The same coating and baking procedures were followed after each solution had been stored for a month in a vessel having a constant temperature of 50° C., whereby its film-forming stability was examined.

The results are shown in Table 2.

EXAMPLES 11 to 20

(Method I of Synthesis)

A coating composition was prepared in each of EXAMPLES 11 to 20 by hydrolyzing and condensing tetraethoxysilane as silicon alkoxide, tetraisopropoxytitanium as titanium alkoxide, hydrated aluminum nitrate ($9H_2O$) as aluminum salt, ethylene glycol as deposition inhibitor, and hexyl glycol as alkylene glycol, in ethanol as a solvent. The amount of the substances used in each EXAMPLE are shown in Table 3.

Referring in further detail to the process, tetraethoxysilane and tetraisopropoxytitanium were fully admixed with a mixed organic solvent composed of ethanol and

TABLE 2

| | Film thickness (Å) | Film formed by coating solution as prepared | | Film formed by solution after storage | |
|---|---|---|---|---|---|
| | | Transparency | Pencil hardness | Transparency | Pencil hardness |
| Example | | | | | |
| 1 | 1200 | 0 | >9H | 0 | >9H |
| 2 | 1200 | 0 | >9H | 0 | >9H |
| 3 | 1200 | 0 | >9H | 0 | >9H |
| 4 | 1000 | 0 | >9H | 0 | >9H |
| 5 | 1000 | 0 | >9H | 0 | >9H |
| 6 | 1100 | 0 | >9H | 0 | >9H |
| 7 | 900 | 0 | >9H | 0 | >9H |
| 8 | 1500 | 0 | >9H | 0 | >9H |
| 9 | 1250 | 0 | >9H | 0 | >9H |
| Comparative Example 1 | 1100 | 0 | >9H | X (Whitened) | — |
| Comparative Example 2 | 900 | 0 | 6H | 0 | 6H | hexylene glycol, and a solution of hydrated aluminum nitrate ($9H_2O$) in water and ethylene glycol was added to the alkoxide mixture, and the mixture was stirred at room temperature for 30 minutes. The process will hereinafter referred to as "Method I of Synthesis":

The viscosity of each coating solution was determined by an E type viscosimeter at 25° C. both immediately after its preparation, and after the lapse of one month. The results are shown in Table 3.

EXAMPLE 21

(Method I of Synthesis)

A coating composition was prepared by repeating EXAMPLE 16, except that 13.7 g (0.06 mol) of tetraethoxytitanium was employed instead of tetraisopropoxysilane, and that the amount of ethanol was increased to 71.6 g. The results are shown in Table 3.

EXAMPLE 22

(Method I of Synthesis)

A coating composition was prepared by repeating EXAMPLE 16, except that ethylene glycol was used instead of hexylene glycol. See Table 3.

EXAMPLE 23

(Method I of Synthesis)

A coating composition was prepared by repeating EXAMPLE 16, except that butyl cellosolve was used intead of hexylene glycol. See Table 3.

EXAMPLE 24

A coating composition was prepared by repeating EXAMPLE 16, except that N-methylpyrrolidone was used instead of ethylene glycol as the deposition inhibitor. See Table 3.

EXAMPLES 25 to 27

Method II of Synthesis)

Coating compositions were prepared by repeating EXAMPLES 16 to 18, respectively, but employing one or more of the following three solutions:

Solution A: Obtained by mixing tetraisopropoxytitanium at room temperature with hexylene glycol;

Solution B: Obtained by mixing tetraethoxysilane with ethanol under stirring; and Solution C: A uniform transparent solution obtained by mixing aluminum nitrate ($9H_2O$), water and ethylene glycol under stirring.

The coating compositions of EXAMPLES 25 and 26 were prepared by mixing Solutions A and B and then adding Solution C at room temperature under mixing and stirring. The coating composition of EXAMPLE 27 was prepared by adding the predetermined amount of ethanol to Solution A and then adding Solution C at room temperature under mixing and stirring.

The process will hereinafter be referred to as "Method II of Synthesis".

EXAMPLE 28

(Method III of Synthesis)

A coating composition was prepared by following EXAMPLE 16, but employing the following solutions:

Solution D: Obtained by adding tetraisopropoxytitanium to hexylene glycol under stirring at room temperature; and Solution E: Obtained by adding a solution of aluminum nitrate in water and ethylene glycol to an ethanol solution of tetraethoxysilane at room temperature and stirring the mixture for 30 minutes.

Solutions D and E were mixed under stirring at room temperature. See Table 3.

The process will hereinafter be referred to as "Method III of Synthesis".

EXAMPLE 29

A coating composition was prepared by mixing a solution obtained by dissolving 14 g of tantalum pentabutoxide in 48.6 g of ethanol with a solution obtained by dissolving 5 g of ethylene glycol as deposition inhibitor and 2.4 g of aluminum nitrate in 30 g of ethanol.

The coating solution was applied onto a glass plate by spin coating at a spinning speed of 2000 rpm, and after it had been dried at 80° C., the resulting film was baked at 300° C. for 20 minutes. There was obtained a transparent film having a pencil hardness of at least 9H.

EXAMPLE 30

A uniform solution was prepared by mixing 11. g of magnesium ethoxide and 40.8 g of aluminum isopropoxide in 200 g of isopropanol, refluxing the mixture for an hour, and cooling it to room temperature. A solution which had been prepared by mixing 83.2 g of tetraethoxysilane, 37.5 g of aluminum nitrate and 50 g of ethylene glycol in 281 g of ethanol was partially hydrolyzed, and admixed with the above solution to yield a uniform and transparent coating composition.

The coating solution was applied onto a glass plate by spin coating at a spinning speed of 2000 rpm, and after it had been dried at 80° C., the resulting film was baked at 300° C. for 20 minutes. There was obtained a transparent film having a pencil hardness of at least 9H.

EXAMPLE 31

A uniform solution was prepared by dissolving 6.7 g of triethoxyborane in 100 g of ethanol. A solution which had been prepared by mixing 41.6 g of tetraethoxysilane 23.4 g of aluminum nitrate and 15 g of ethylene glycol uniformly in 93.3 g of ethanol was added to the triethoxyborane solution to yield a coating composition.

The coating solution was applied onto a glass plate by spin coating at a spinning speed of 2000 rpm, and after it had been dried at 80° C., the resulting film was baked at 300° C. for 20 minutes. There was obtained a transparent film having a pencil hardness of at least 9H.

COMPARATIVE EXAMPLE 3

A coating composition was prepared by repeating EXAMPLE 16, except that N-methylpyrrolidone was used as the precipitation inhibitor, with no hexylene glycol. It formed a gel after one month. See Table 3.

COMPARATIVE EXAMPLE 4

A coating composition was prepared by repeating EXAMPLE 27, except that ethanol was used instead of hexylene glycol, and N-methylpyrrolidone as the deposition inhibitor. After one month, it formed a gel. See Table 3.

COMPARATIVE EXAMPLE 5

A coating composition was prepared by repeating EXAMPLE 16, except that no aluminum nitrate was used, and that 0.1 g of concentrated nitric acid (1 mol % of the alkoxide) was used as a catalyst. See Table 3.

In Table 3, HG means hexylene glycol, EG means ethylene glycol, BC means butyl cellosolve, "*" means that N-methylpyrrolidone was used as the deposition inhibitor, Et means ethyl and iPr means isopropyl.

TEST EXAMPLES

Each of the coating compositions which had been obtained in EXAMPLES 1 and 11 to 28 and COMPARATIVE EXAMPLES 1 to 3 was applied onto a glass base, and after it had been dried at 80° C. for 10 minutes, the resulting film was baked at 300° C. for 20 minutes. The film formed by each composition was examined for thickness and pencil hardness. The refractive index was determined of each of the films which had been formed by the compositions of EXAMPLES 1 and 11 to 18. The film-forming procedure was repeated after one month of storage and the thickness of each film was determined. The results are shown in Table 4.

TABLE 3

| | Si(OEt)$_4$ | | Ti(OR')$_4$ | | | Alkylene glycol | | EtOH | Al(NO$_3$)9H$_2$O | |
|---|---|---|---|---|---|---|---|---|---|---|
| | g | mol | kind | g | mol | kind | amount (g) | g | g | mol |
| EXAMPLE 11 | 18.7 | 0.09 | Ti(OiPr)$_4$ | 2.8 | 0.01 | HG | 11.8 | 63.7 | 9.4 | 0.025 |
| EXAMPLE 12 | 16.6 | 0.08 | Ti(OiPr)$_4$ | 5.7 | 0.02 | HG | 23.6 | 69.1 | 9.4 | 0.025 |
| EXAMPLE 13 | 14.6 | 0.07 | Ti(OiPr)$_4$ | 8.5 | 0.03 | HG | 35.4 | 44.5 | 9.4 | 0.025 |
| EXAMPLE 14 | 12.5 | 0.06 | Ti(OiPr)$_4$ | 11.4 | 0.04 | HG | 23.6 | 61.3 | 9.4 | 0.025 |
| EXAMPLE 15 | 10.4 | 0.05 | Ti(OiPr)$_4$ | 14.2 | 0.05 | HG | 23.6 | 63.6 | 9.4 | 0.025 |
| EXAMPLE 16 | 8.3 | 0.04 | Ti(OiPr)$_4$ | 17.0 | 0.06 | HG | 21.2 | 68.3 | 9.4 | 0.025 |
| EXAMPLE 17 | 4.2 | 0.02 | Ti(OiPr)$_4$ | 22.7 | 0.08 | HG | 47.7 | 47.7 | 9.4 | 0.025 |
| EXAMPLE 18 | 0 | 0 | Ti(OiPr)$_4$ | 28.4 | 0.1 | HG | 23.6 | 76.8 | 9.4 | 0.025 |
| EXAMPLE 19 | 8.3 | 0.04 | Ti(OiPr)$_4$ | 17.0 | 0.06 | HG | 89.0 | 0 | 9.4 | 0.025 |
| EXAMPLE 20 | 8.3 | 0.04 | Ti(OiPr)$_4$ | 17.0 | 0.06 | HG | 24.9 | 24.9 | 24.8 | 0.066 |
| EXAMPLE 21 | 8.3 | 0.04 | Ti(OEt)$_4$ | 13.7 | 0.06 | HG | 21.2 | 71.6 | 9.4 | 0.025 |
| EXAMPLE 22 | 8.3 | 0.04 | Ti(OiPr)$_4$ | 17.0 | 0.06 | EG | 11.2 | 78.3 | 9.4 | 0.025 |
| EXAMPLE 23 | 8.3 | 0.04 | Ti(OiPr)$_4$ | 17.0 | 0.06 | BC | 21.2 | 68.3 | 9.4 | 0.025 |
| EXAMPLE 24 | 8.3 | 0.04 | Ti(OiPr)$_4$ | 17.0 | 0.06 | HG | 21.2 | 68.3 | 9.4 | 0.025 |
| EXAMPLE 25 | 8.3 | 0.04 | Ti(OiPr)$_4$ | 17.0 | 0.06 | HG | 21.2 | 68.3 | 9.4 | 0.025 |
| EXAMPLE 26 | 4.2 | 0.02 | Ti(OiPr)$_4$ | 22.7 | 0.08 | HG | 47.2 | 47.7 | 9.4 | 0.025 |
| EXAMPLE 27 | 0 | 0 | Ti(OiPr)$_4$ | 28.4 | 0.1 | HG | 23.6 | 76.8 | 9.4 | 0.025 |
| EXAMPLE 28 | 8.3 | 0.04 | Ti(OiPr)$_4$ | 17.0 | 0.06 | HG | 21.2 | 68.3 | 9.4 | 0.025 |
| COM. EX. 3 | 8.3 | 0.04 | Ti(OiPr)$_4$ | 17.0 | 0.06 | — | 0 | 89.5 | 9.4 | 0.025 |
| COM. EX. 4 | 8.3 | 0.04 | Ti(OiPr)$_4$ | 17.0 | 0.06 | — | 0 | 89.5 | 9.4 | 0.025 |
| COM. EX. 5 | 8.3 | 0.04 | Ti(OiPr)$_4$ | 17.0 | 0.06 | HG | 21.2 | 74.1 | 0 | 0 |

| | H$_2$O g | EG g | Si/Ti mol ratio | Alkylene glycol/Ti | Al Si + Ti + Al mol ratio | cps Initial | After one month | Method of Synthesis |
|---|---|---|---|---|---|---|---|---|
| EXAMPLE 11 | 3.6 | 15 | 9/1 | 10/1 | 0.2 | 5.6 | 5.6 | I |
| EXAMPLE 12 | 3.6 | 15 | 8/2 | 10/1 | 0.2 | 5.8 | 6.0 | I |
| EXAMPLE 13 | 1.8 | 15 | 7/3 | 10/1 | 0.2 | 6.2 | 7.0 | I |
| EXAMPLE 14 | 1.8 | 15 | 6/4 | 5/1 | 0.2 | 5.8 | 8.3 | I |
| EXAMPLE 15 | 1.8 | 15 | 5/5 | 4/1 | 0.2 | 5.6 | 9.5 | I |
| EXAMPLE 16 | 1.8 | 15 | 4/6 | 3/1 | 0.2 | 5.2 | 8.6 | I |
| EXAMPLE 17 | 1.8 | 15 | 2/8 | 5/1 | 0.2 | 7.3 | 10.5 | I |
| EXAMPLE 18 | 1.8 | 15 | 0/10 | 2/1 | 0.2 | 6.0 | 9.0 | I |
| EXAMPLE 19 | 1.8 | 15 | 4/6 | 12.6/1 | 0.2 | 25 | 46 | I |
| EXAMPLE 20 | 1.8 | 43 | 4/6 | 3/1 | 0.4 | 30 | 41 | I |
| EXAMPLE 21 | 1.8 | 15 | 4/6 | 3/1 | 0.2 | 5.5 | 9.1 | I |
| EXAMPLE 22 | 1.8 | 15 | 4/6 | 3/1 | 0.2 | 6.0 | 9.0 | I |
| EXAMPLE 23 | 1.8 | 15* | 4/6 | 3/1 | 0.2 | 4.2 | 9.6 | I |
| EXAMPLE 24 | 1.8 | *15 | 4/6 | 3/1 | 0.2 | 5.2 | 6.5 | II |
| EXAMPLE 25 | 1.8 | 15 | 4/6 | 3/1 | 0.2 | 5.2 | 6.5 | II |
| EXAMPLE 26 | 1.8 | 15 | 2/8 | 5/1 | 0.2 | 7.3 | 8.2 | II |
| EXAMPLE 27 | 1.8 | 15 | 0/10 | 2/1 | 0.2 | 6.0 | 7.1 | II |
| EXAMPLE 28 | 1.8 | 15 | 4/6 | 3/1 | 0.2 | 5.2 | 5.2 | III |
| COM. EX. 3 | 1.8 | *15 | 4/6 | 0 | 0.2 | 3.4 | geled | I |
| COM. EX. 4 | 1.8 | *15 | 4/6 | 0 | 0.2 | 3.4 | geled | III |
| COM. EX. 5 | 5.4 | 15 | 4/6 | 3/1 | 0 | 3.0 | 5.5 | I |

COM. EX. means COMPARATIVE EXAMPLE

TABLE 4

| Example | Film thickness (Å) | Pencil hardness | Refractive index | Film thickness after one month |
|---|---|---|---|---|
| 1 | 1200 | >9H | 1.45 | 1200 |
| 11 | 1300 | >9H | 1.48 | 1350 |
| 12 | 1350 | >9H | 1.50 | 1400 |
| 13 | 1450 | >9H | 1.55 | 1500 |
| 14 | 1300 | >9H | 1.60 | 1600 |
| 15 | 1400 | >9H | 1.65 | 1650 |
| 16 | 1400 | >9H | 1.71 | 1700 |
| 17 | 1500 | >9H | 1.85 | 1800 |
| 18 | 1500 | >9H | 2.10 | 1800 |
| 19 | 1750 | >9H | | 2300 |
| 20 | 1800 | >9H | | 2300 |
| 21 | 1350 | >9H | | 1700 |
| 22 | 1300 | >9H | | 1700 |
| 23 | 1250 | >9H | | 1650 |
| 24 | 1100 | >9H | | 1300 |
| 25 | 1300 | >9H | | 1350 |
| 26 | 1300 | >9H | | 1350 |
| 27 | 1300 | >9H | | 1400 |
| 28 | 1300 | >9H | | 1300 |
| Comparative Example 3 | 1200 | >9H | | Geled |
| Comparative Example 4 | 1100 | 7H | | 1300 |

TABLE 4-continued

| Example | Film thickness (Å) | Pencil hardness | Refractive index | Film thickness after one month |
|---|---|---|---|---|
| ative Example 5 | | | | |

What is claimed is:

1. A coating composition consisting essentially of a product obtained by hydrolyzing and condensing a metal alkoxide of the general formula:

$$M(OR)_n \qquad (I)$$

wherein M represents a metal selected from the group consisting of silicon, titanium, tantalum, zirconium, boron, aluminum, magnesium and zinc; R represents an alkyl group having 1 to 5 carbon atoms, and n represents the valence number of M in an organic solvent in the presence of an aluminum salt which is soluble in water or an organic solvent; and adding a deposition inhibitor.

2. A coating composition as claimed in claim 1, wherein said alkoxide is a compound selected from the group consisting of silicon alkoxides and partial condensation products thereof.

3. A coating composition as claimed in claim 1, wherein said alkoxide is a mixture of a compound selected from the group consisting of silicon alkoxides and partial condensation products thereof, and a titanium alkoxide.

4. A coating composition as claimed in claim 1, wherein said alkoxide is a titanium alkoxide.

5. A coating composition as claimed in claim 1, wherein said inhibitor is a compound selected from the group consisting of N-methylpyrrolidone, ethylene glycol, dimethyl formamide, dimethylacetamide, diethylene glycol and the derivatives thereof.

6. A coating composition as claimed in claim 1, wherein aluminum atoms have the following relation by molar ratio to the metal atoms M in said alkoxide:

$$0.01 \leq \frac{Al}{M + Al} \leq 0.7.$$

7. A coating composition consisting essentially of a product obtained by hydrolyzing and condensing a metal alkoxide of the general formula:

$$M(OR)_n \qquad (I)$$

wherein M represents a metal selected from the group consisting of silicon, titanium, tantalum, zirconium, boron, aluminum, magnesium and zinc; R represents an alkyl group having 1 to 5 carbon atoms, and n represents the valence number of M in an organic solvent in the presence of an aluminum salt which is selected from the group consisting of aluminum nitrate, aluminum chloride, aluminum oxalate and basic salts thereof; and adding a deposition inhibitor.

8. A coating composition as claimed in claim 3 wherein said solvent contains a compound selected from the group consisting of alkylene glycols and the monoether derivatives thereof.

9. A process for manufacturing a coating composition consisting essentially of the steps of:

hydrolyzing and condensing a metal alkoxide of the general formula:

$$M(OR)_n \qquad (I)$$

wherein M represents a metal selected from the group consisting of silicon, titanium, tantanlum, zirconium, boron, aluminum, magnesium and zinc; R represents an alkyl group having 1 to 5 carbon atoms, and n represents the valence number of M in an organic solvent in the presence of an aluminum salt which is soluble in water or an organic solvent; and adding a deposition inhibitor.

10. A process for manufacturing a coating composition as claimed in claim 9, wherein said alkoxide is a mixture of a compound selected from the group consisting of silicon alkoxides and partial condensation products thereof, and a titanium alkoxide, and said titanium alkoxide is mixed with a compound selected from the group consisting of alkylene glycols and the monoethers thereof before said mixture is hydrolyzed.

11. A process for manufacturing a coating composition as claimed in claim 9, wherein said alkoxide is a titanium alkoxide, and said alkoxide is mixed with a compound selected from the group consisting of alkylene glycols and the monoethers thereof before it is hydrolyzed.

12. A process for manufacturing a coating composition as claimed in claim 9, wherein said alkoxide is a mixture of a silicon alkoxide and a titanium alkoxide, wherein said silicon alkoxide is hydrolyzed in the presence of said aluminum salt, and mixed with a solution of said titanium alkoxide in a compound selected from the group consisting of alkylene glycols and the monoethers thereof, and the mixture is condensed.

* * * * *